Figure 1:
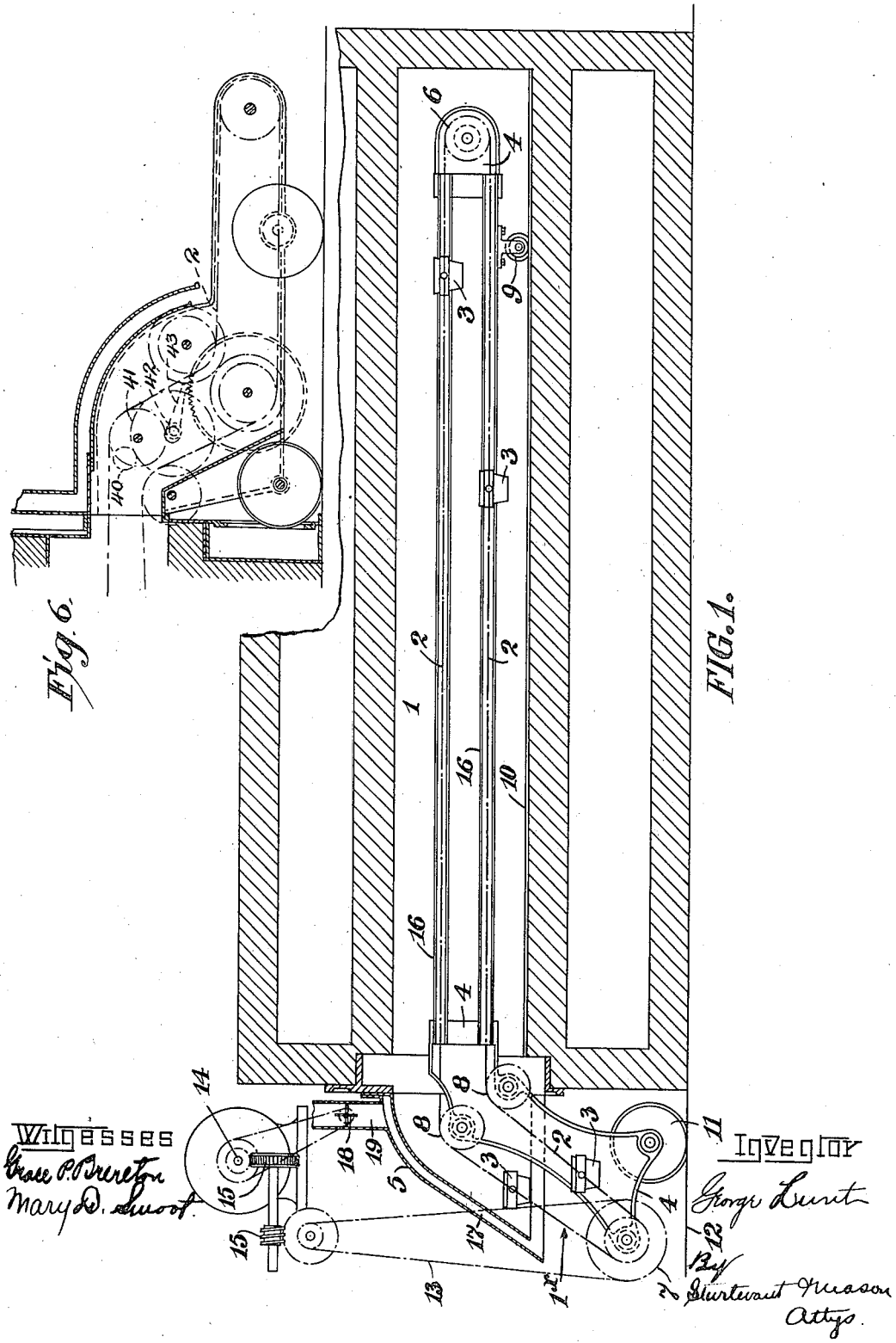

G. LUNT.
BAKER'S OVEN.
APPLICATION FILED JUNE 12, 1913.

1,184,467.

Patented May 23, 1916.
4 SHEETS—SHEET 1.

G. LUNT.
BAKER'S OVEN.
APPLICATION FILED JUNE 12, 1913.

1,184,467.

Patented May 23, 1916.
4 SHEETS—SHEET 2.

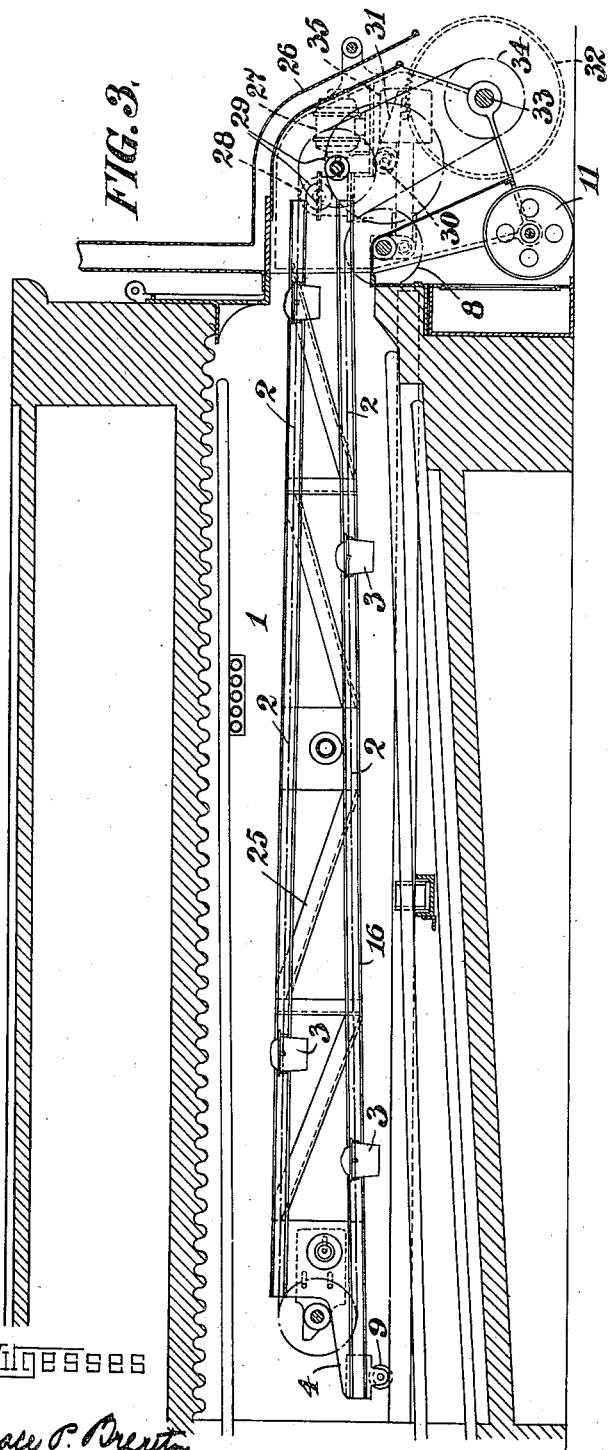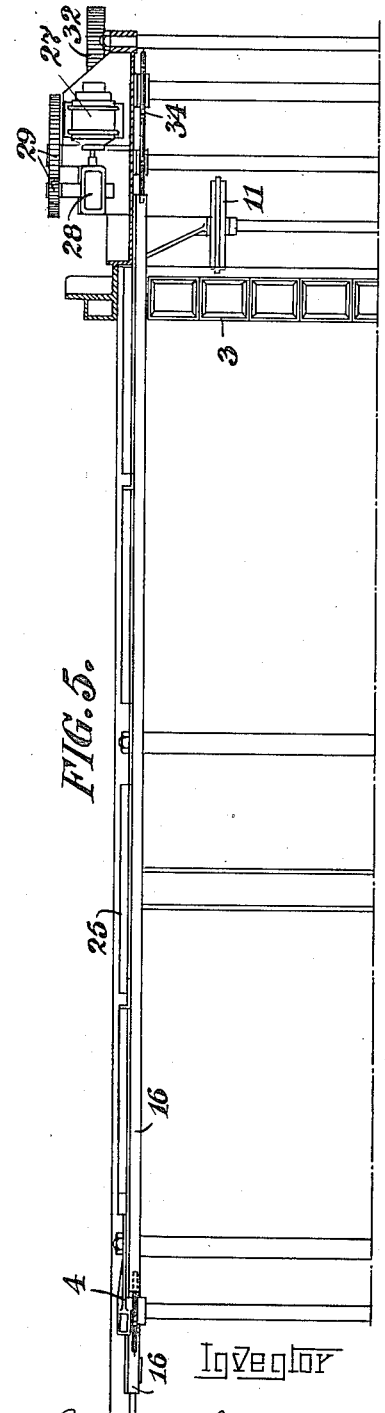

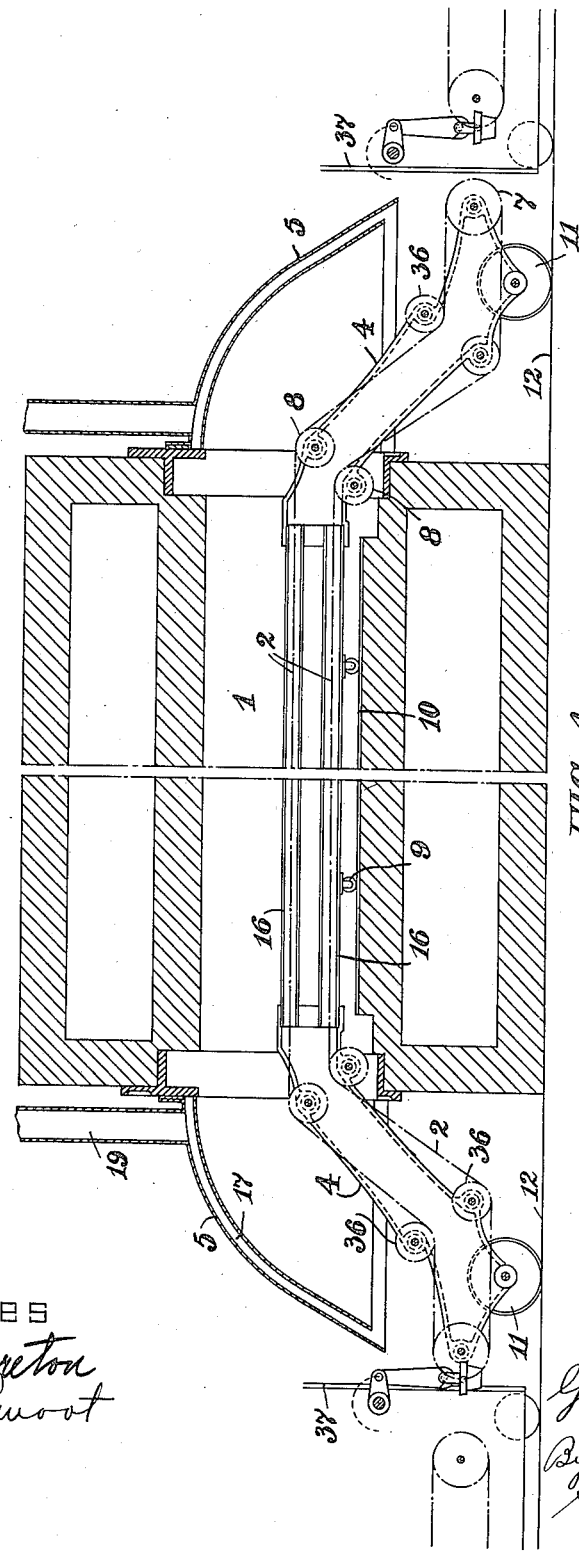

UNITED STATES PATENT OFFICE.

GEORGE LUNT, OF FORMBY, ENGLAND.

BAKER'S OVEN.

1,184,467.

Specification of Letters Patent.  Patented May 23, 1916.

Application filed June 12, 1913. Serial No. 773,277.

*To all whom it may concern:*

Be it known that I, GEORGE LUNT, subject of the King of Great Britain, residing at Formby, in the county of Lancaster, in the Kingdom of England, have invented certain new and useful Improvements in Bakers' Ovens, of which the following is a specification.

This invention relates to bakers' ovens of the type having endless chains or conveyers supporting trays or receptacles containing dough loaves or other like articles to be baked. The defect in this class of oven in cases where the conveyers project through the oven mouth, is the difficulty of closing the entrance or exit of the oven chamber while the goods are being fed into or delivered from the baking chamber by the chains so as to exclude the entrance of cold air. This circumstance coupled with the difficulty of cleaning the oven chamber and the effecting of repairs owing to the oven being so obstructed by the conveyer chains and the great heat which absolutely prohibits any one entering the oven chamber, prevent many bakers from adopting these traveling chain ovens, however great their advantages may be.

Now the present invention, which is designed to remove these objections, is characterized by the feature that the traveling conveyer for the dough portions passes around pulleys mounted upon a carriage, contained mainly within the over chamber, but with the end projecting out through the oven chamber mouth to receive the dough charges, or deliver the baked bread, such carriage being adapted to be slid or moved bodily out of the oven chamber when required, whereby the said carriage with the conveyer can without extinguishing the fire be moved out of the oven for cleaning purposes or repairs, or run back again into position for use. When run out, the oven chamber is left free of any obstruction inside.

The invention is further characterized by the feature that that portion of the chain conveyer which projects outside the oven chamber to receive the dough charges or deliver the baked bread, is deflected into a different plane from that part inside the baking space, and such deflected part is covered or protected by a shield or canopy adapted to extend across the oven mouth in such a way that the direct access of cold air into the oven is prevented, and yet form no obstruction to the said projecting part of the chains, conveying the charges into and out of the oven.

The invention is further characterized in that the carriage is adapted at one end to run on the sole of the oven chamber, and at the other on the floor of the bakehouse.

One of the advantages resulting from the use of the present invention is, that the delivery of the baked goods may be effected at the same end of the oven and at or about the same point, as that at which charging takes place, thus rendering the invention peculiarly adapted for the automatic charging and discharging of the conveyer.

Figure 2:
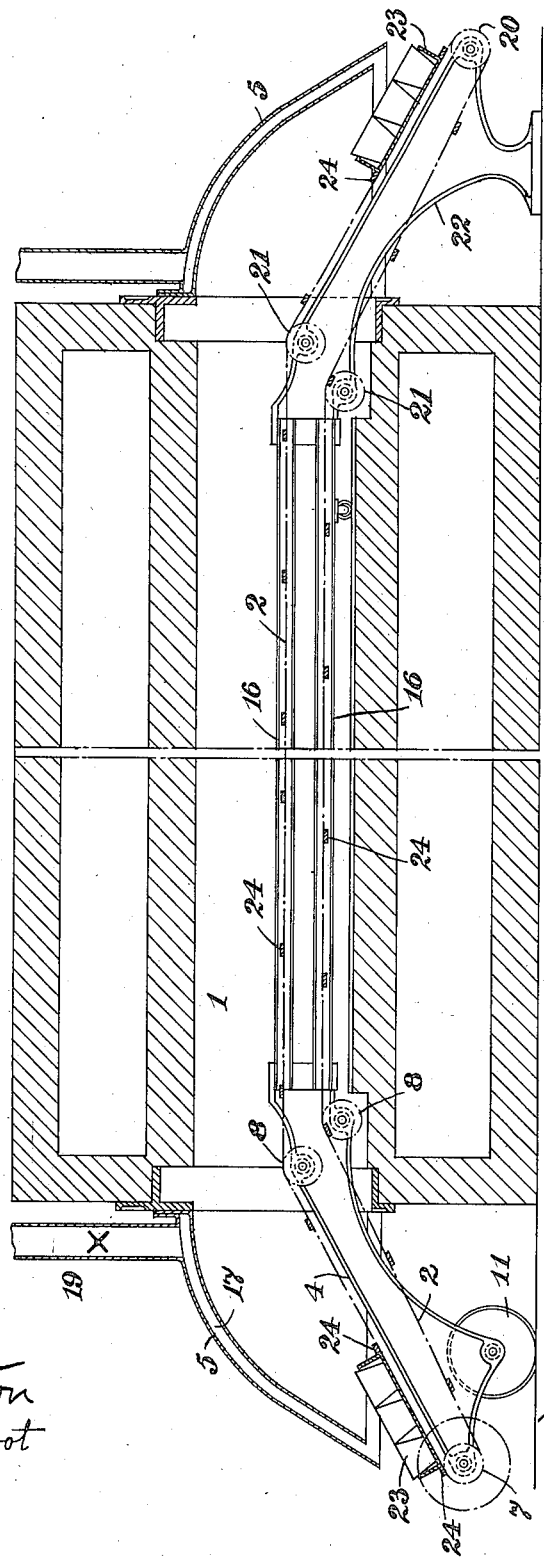

In the accompanying drawings: Figures 1 and 3 are longitudinal sections of bakers' ovens of the type referred to, provided with an opening at one end for charging and discharging; Figs. 2 and 4 are longitudinal sections of bakers' ovens provided with an opening at one end for charging and an opening at the other for discharging; Fig. 5 is a plan view of Fig. 3. Fig. 6 is a detail view.

Referring first to Fig. 1, the baking chamber 1 is provided with an opening at one end for charging and discharging, and I employ two or more endless conveyer chains 2 having a plurality of buckets or receptacles 3 (only four of which are shown) for the dough portions pivotally suspended between them. These endless conveyer chains pass around guide pulleys mounted upon a carriage 4, the disposition of the guide pulleys being such that the endless chains carrying the receptacles after passing along the oven chambers are deflected into a different plane from that part inside the baking space 1, and such deflected part is covered or protected by a hood like shield or canopy 5 adapted to extend across the oven mouth in such a way that the direct access of cold air into the oven is prevented and yet form no obstruction to the chains and their receptacles conveying the charges into and out of the oven. For instance there are a pair of guide pulleys 6 mounted in the frame of the carriage 4 at the back end of the oven chamber, and another pair 7 outside the baking chamber at the front, and yet another pair or pairs 8 at the place where the chains are deflected. The carriage at one end has wheels 9 which run on the sole 10 of the oven chamber, and at the other end wheels 11 which run on the floor 12 of the bakehouse, and the canopy 5 which spigots into the mouth of the oven, is affixed to the carriage 4. The conveyer chains 2 are driven by suitable gear either continuously at a slow speed or intermittently. The driving gear shown in the figure embodies a driving belt 13 driven from the driving shaft 14 by worm gears 15, such driving shaft being journaled in bearings which are supported on the canopy 5 or independently. In order to prevent the conveyer chains 2 sagging in their passage through the oven, they are arranged to run in guide rails 16 secured to or forming part of the carriage 4.

It will be noticed that the canopy 5 projects down below the sole 10 of the oven chamber, and shields or covers those portions of the conveyer chains which project out in front of the oven chamber. Thus substantially the whole of the conveyer chains remain in the oven chamber or its canopied extension, and owing to this the chains and their receptacles are always *in situ* in the oven during feeding, baking, and discharging and are kept permanently hot, which is in marked contrast to the ordinary draw plate which is cooled when drawn out of the oven for charging and discharging. The canopy 5 not only prevents cold air entering the oven, but it retains in the oven chamber the steam that is evaporated out of the articles being baked. This hood or canopy causes the steam injected or evolved within the oven to be trapped about the entrance thereto, and form a steam zone through which the relatively cold loaves pass on their approach to the oven, so as to come into contact with the steam at a lower temperature and therefore produce condensation, and give a glutinous surface to the dough, which when the bread is baked in the intense heat of the oven, becomes of very superior glaze or bloom, that is so fine that it might be termed viterous or glass like in appearance. If desired the canopy can have a conduit 17 and in connection therewith a suction fan 18 or flue 19 for drawing off any excess steam from the oven chamber 1.

The dough portions to be baked are placed by hand or automatically into the receptacles 3 hereinbefore referred to as they arrive in turn at the point 1ˣ or receptacles previously filled with dough portions are slipped in turn onto the chains at 1ˣ so as to be pivotally suspended between them. The conveyer chains being in motion, the receptacles that have been filled pass into the canopy 5 and thence into the oven, and empty receptacles or spaces for receptacles are brought into position to receive a fresh charge and so on, each charge being carried along the baking chamber by the forward or upper length of the carrier 2 and then back again by the lower or returning length, the dough portions being baked by the time they reach the front end of the oven again, where they are discharged; or in some cases it may be found more convenient when the oven has been filled with loaded receptacles, for the conveyer chains to remain stationary for a time while the baking proceeds. From time to time when the baking chamber requires cleaning or repair, the whole chain conveyer can be wheeled bodily out of the oven by means of the carriage 4, or run back again into position for use.

Referring to Fig. 2, the baking chamber 1 has a charging opening at one end, and a discharging opening at the other, and the disposition of the guide pulleys is such that the parts of the endless chains 2 outside the oven chamber at each end are deflected into a different plane from the part inside the baking space, and both such deflected parts are covered or protected by hood like shields or canopies 5. In this case the guide pulleys 7 and 8 for the conveyer chains are mounted in the frame of the carriage 4, while the guide pulleys 20 and 21 are mounted in a fixed frame 22, the end of the movable carriage 4 engaging the fixed frame when the oven is in use. With this arrangement the loaded receptacles are placed on the carrier at one end of the oven chamber and after passing into it and remaining for the necessary period, are caused to emerge at the other. In order to draw the carriage 4 out of the oven chamber 1, the chains are severed or disconnected at some point in their length.

Instead of the receptacles being pivotally suspended from the conveyer chains, the said chains may be arranged to receive and support pans or receptacles in which the dough to be baked is placed. In this case the receptacles are assembled together into batteries of receptacles 23 (Fig. 2), each receptacle of the battery being adapted to receive one dough portion, and when one battery is filled, it is placed on the conveyer, then another battery filled and placed on the conveyer and so on. The conveyer is furnished in this case with abutments or ribs 24 so as to receive a battery between them and form stops to hold the batteries in position on the conveyer. In this arrangement it is the uppermost run of the conveyer which receives the batteries, and consequently forms a moving platform for the rigid batteries to rest on, the stops insuring that the batteries shall travel with the carrier.

Figs. 3 and 5 illustrate a baker's oven whose conveyer mechanism is arranged somewhat similar to Fig. 1 but elaborated somewhat, like reference numerals referring to similar parts. The rails 16 are stayed by the ties 25, and the canopy 26 is in the form of a rectangular tube which forms a bent extension of the oven chamber. To the exterior of this canopy at the side is fixed the motor 27 which drives a worm gear within the box 28, said worm gear driving through the gear wheels 29, the shaft 30 operating by means of an eccentric the ratchet arm 31. This drives the ratchet wheel 32 on the shaft 33 to which is keyed the guide pulley 34 which drives the conveyer chain 2. The conveyer chain is kept taut by the shaft of the guide pulley 8, being journaled in sliding bearings, which are under the influence of the weighted lever 35.

Fig. 4 illustrates a baker's oven whose conveyer mechanism is arranged somewhat similar to Fig. 2 but elaborated somewhat and the disposition of the guide pulleys is such, that the endless conveyer chains 20 carrying the receptacles, are after being deflected downward, again deflected into a horizontal plane below the plane of the oven, for which purpose additional guide pulleys 36 are used in addition to the guide pulleys 6, 7 and 8. This arrangement is useful in cases where transporting carriages or vehicles such as 37 are used for transferring the unbaked dough to the entrance end of the oven, and for transferring the baked bread from the delivery end of the oven, as described in my application for patent filed concurrently with this. Furthermore in this embodiment there are two complete sets of conveyer chains 2 each mounted on guide pulleys in a separate carriage 4, 4, each carriage having at one end wheels 9 which run on the oven sole 10, and at the other end wheels 11 which run on the floor of the bakehouse. The conveyer chains of each carriage coöperate with each other, so that at the adjacent ends, the one set of conveyer chains deliver the receptacles to the other set of conveyer chains. When required, either chain conveyer can be wheeled bodily out of the oven by means of their carriages 4, or run back again into position for use. The horizontal portion on the lower plane, than the oven sole, may project any suitable distance in front of the oven according to the type of transferring device that is to be used, and of course any suitable gearing may be used to drive the conveyer chains, as for instance a gear wheel 40, Fig. 6, (driven by some suitable source of power) which gives motion through another gear wheel 41 to eccentrics 42, which reciprocate ratchet arms 43. These drive with a slow motion a pair of the pulleys around which pass the conveyer chains.

I declare that what I claim is:—

1. In a continuous oven or baking machine, the combination with the oven or baking chamber of a traveling conveyer for the dough charges, pulleys for the said conveyer mounted upon a carriage contained mainly within the oven chamber, but with the end together with part of the conveyer projecting out through the oven mouth to receive the dough charges or deliver the baked bread, such carriage being adapted to be slid or moved bodily out of the oven chamber when required.

2. In a continuous oven or baking machine, the combination with the oven or baking chamber of a traveling conveyer, having parts projecting outside the oven chamber to receive the dough charges, and deflected into a different plane from that portion of the conveyer inside the oven, and a hood like shield or canopy adapted to extend across the oven mouth and cover the projecting part of the conveyer to prevent the direct access of cold air into the baking space, and the escape therefrom of steam.

3. In a continuous oven or baking machine, the combination with the oven of a traveling chain conveyer mounted on guide pulleys, a carriage adapted at one end to run on the sole of the oven chamber, and at the other on the floor of the bakehouse, and supporting said guide pulleys whereby the said conveyer can be moved bodily out of the oven for cleaning purposes or repairs, or run back again into position for use.

4. In a traveling chain conveyer oven, the combination with the mouth or mouths of said oven, of a hood-like shield or canopy open on its under side which covers the projecting end of the conveyer chain and projects down below the sole of the oven chamber and a conduit in the said hood for drawing off excess steam from the oven chamber.

5. A traveling chain conveyer oven having a conveyer chain passing along the oven chamber and deflected diagonally out of the plane of the oven, a hood-like shield or canopy covering such deflected part and projecting down below the sole of the oven, said chain after being deflected diagonally being again deflected into a horizontal plane below the plane of the oven and below the bottom of the hood-like shield or canopy.

6. A continuous baker's oven having in its interior a carriage contained within the oven chamber, with a part projecting out through the open end, guide pulleys mounted at the ends of the carriage around which pulleys a conveyer for the dough portions passes, guide rails secured to or forming part of the carriage for supporting the upper and lower runs of the conveyer in the intervening space between the guide pulleys.

7. In a continuous oven or baking chamber, the combination with the oven or baking chamber of a hood-like shield or canopy adapted to extend across the oven mouth and cover the projecting part of the conveyer to prevent the direct access of air into the baking space and trap at the entrance to the oven chamber the steam that is generated or injected during the process of baking, and form a steam zone through which the relatively cold loaves pass on their approach to the oven, whereby a condensation of steam is produced on the cold surface of the dough or bread, and gives a glutinous surface to the dough which when the bread is baked in the intense heat of the oven becomes of very superior glaze or bloom.

In witness whereof, I have hereunto signed my name this 4th day of June 1913, in the presence of two subscribing witnesses.

GEORGE LUNT.

Witnesses:
G. C. DYMOND,
G. H. HOYLE.